(12) United States Patent
Sterner et al.

(10) Patent No.: US 8,863,940 B2
(45) Date of Patent: Oct. 21, 2014

(54) DRAG CONVEYOR SYSTEM

(75) Inventors: Keith W. Sterner, Easton, PA (US);
John F. Simonof, Jr., Easton, PA (US);
Korey A. Szapacs, Northampton, PA (US); David R. Gill, Easton, PA (US)

(73) Assignee: Flexicon Corporation, Bethlehem, PA (US)

( * ) Notice: Subject to any disclaimer, the term of this patent is extended or adjusted under 35 U.S.C. 154(b) by 211 days.

(21) Appl. No.: 13/302,229

(22) Filed: Nov. 22, 2011

(65) Prior Publication Data
US 2012/0279829 A1 Nov. 8, 2012

Related U.S. Application Data

(60) Provisional application No. 61/482,766, filed on May 5, 2011.

(51) Int. Cl.
*B65G 19/14* (2006.01)
*B65G 19/24* (2006.01)

(52) U.S. Cl.
CPC ............... *B65G 19/14* (2013.01); *B65G 19/24* (2013.01)
USPC ........... 198/747; 198/716; 198/727; 198/731; 198/733

(58) Field of Classification Search
None
See application file for complete search history.

(56) References Cited

U.S. PATENT DOCUMENTS

| 499,525 | A | 6/1893 | Dodge |
|---|---|---|---|
| 747,160 | A | 12/1903 | Garland |
| 810,149 | A | 1/1906 | Horst |
| 1,321,811 | A | 11/1919 | Dellenbach |
| 2,124,485 | A | 7/1938 | Dellenbach |
| 2,193,530 | A | 3/1940 | Cottengim |
| 2,609,081 | A | 9/1952 | Hapman |
| 3,722,664 | A | 3/1973 | Hart et al. |
| 4,071,136 | A | 1/1978 | Jones |
| 4,195,725 | A | 4/1980 | Jones |
| 4,962,847 | A | 10/1990 | Pisors et al. |
| 5,318,168 | A | 6/1994 | Rappen |
| 5,865,296 | A * | 2/1999 | Angus ........................... 198/716 |
| 7,267,218 | B1 * | 9/2007 | Van Zee et al. ................ 198/727 |
| 2002/0043449 | A1 | 4/2002 | Ambs et al. |
| 2003/0010602 | A1 | 1/2003 | Jagan |

FOREIGN PATENT DOCUMENTS

NZ 194270 3/1984

OTHER PUBLICATIONS

Conveyor Tubular Drag, 2010 Hapman, www.hapman.com.
Tubular Cable & Chain Drag Conveyors, Problem Solvers in a Pipeline, Spiroflow Global Powder Handling Solutions. (Undated Admitted Prior Art).
Modern Process Equipment, Chain-Vey, The MPE Chain-Vey® Tubular Drag-Chain Conveyor. (Undated Admitted Prior Art).

* cited by examiner

*Primary Examiner* — Kavel Singh
(74) *Attorney, Agent, or Firm* — Volpe and Koenig, P.C.

(57) ABSTRACT

A drag conveyor system having a tube and a traction element extending through tube is provided. A plurality of slugs are connected to the traction element, each of the slugs including a slug flange. A disk is removably attached to each of the slugs, with the disk including first and second disk parts that are adapted to be placed around the cable and are engagable with one another and/or the slug so that each of the disks is located on the respective one of the slugs. A snap clip is engaged to each of the slugs, with the snap clip including a flange located on an opposite side of the disk from the slug flange that, together with the slug flange, maintains the first and second disk parts together and engaged with the slug in a fixed position on the slug.

16 Claims, 7 Drawing Sheets

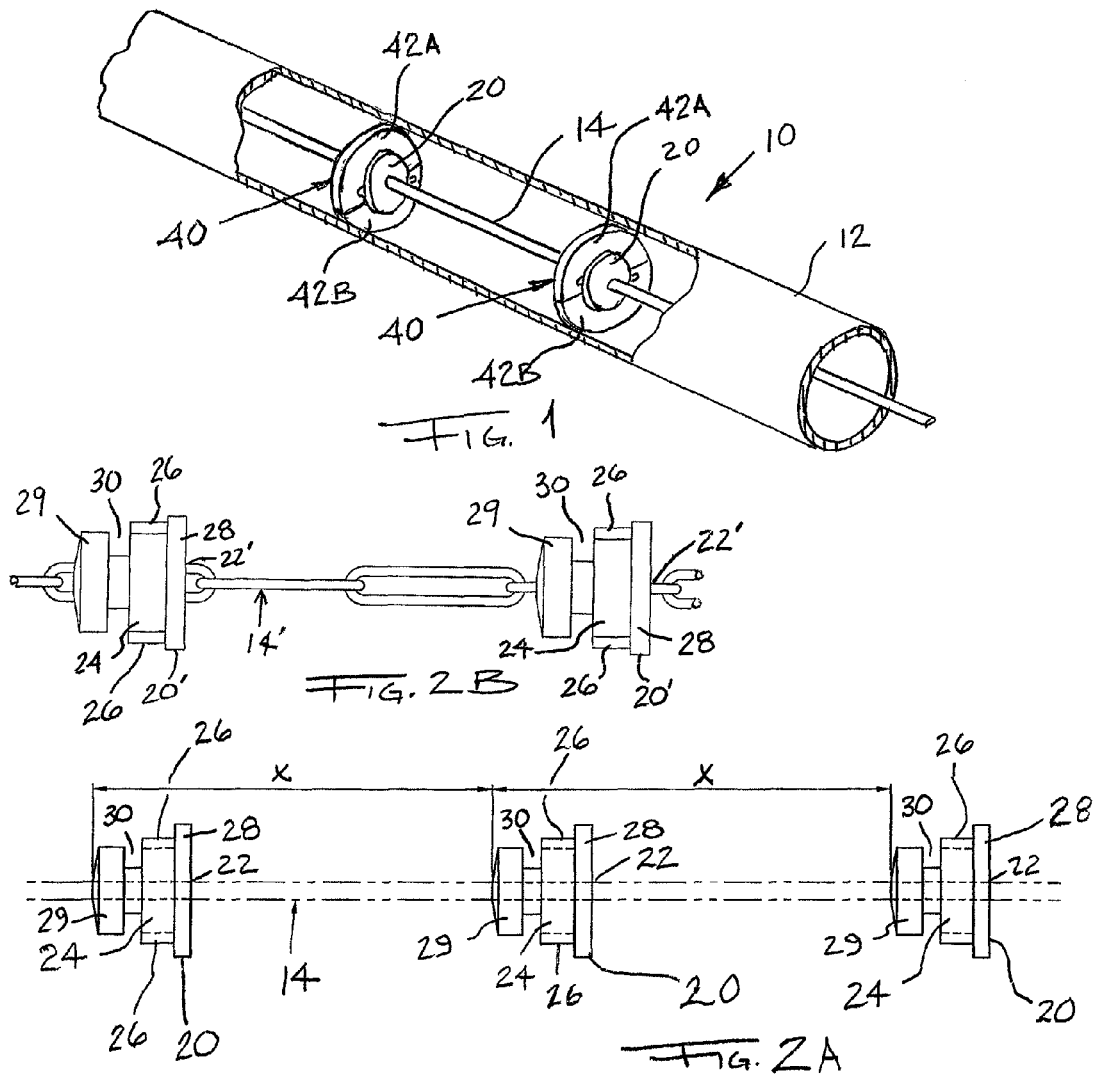

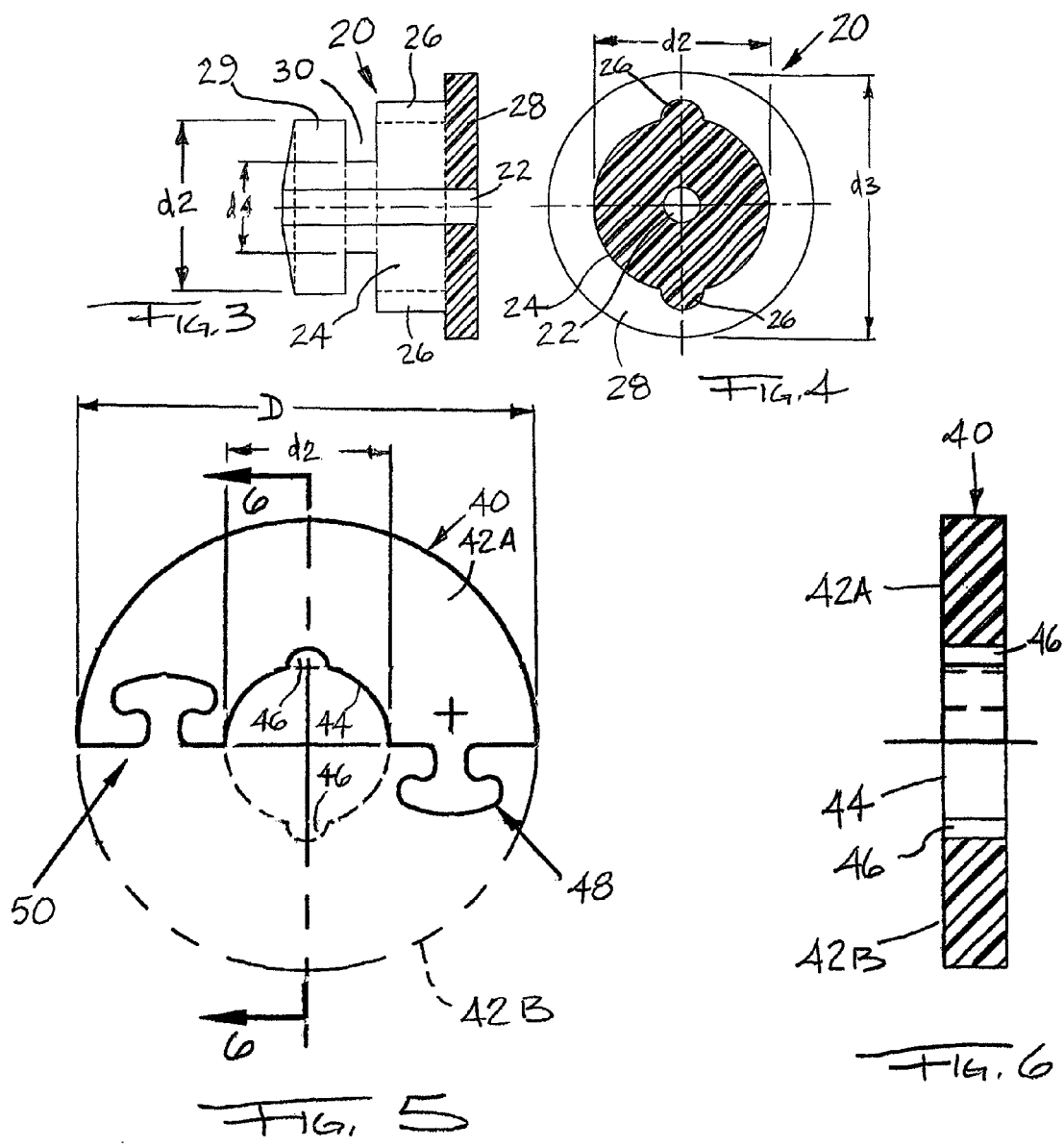

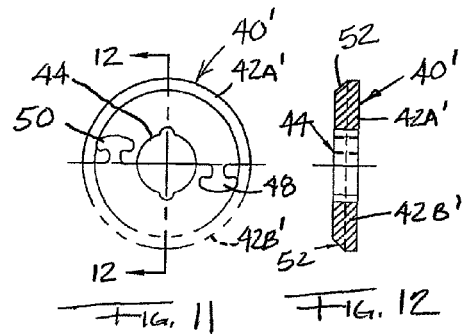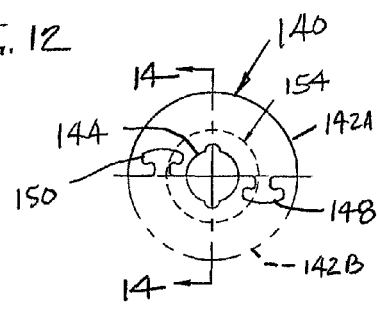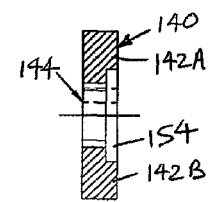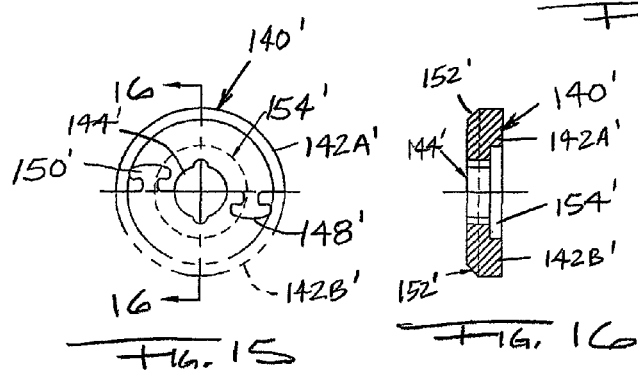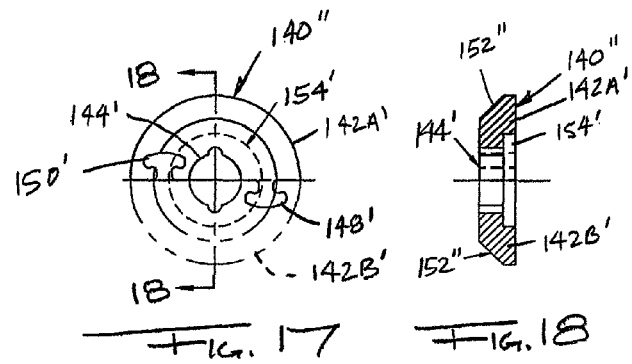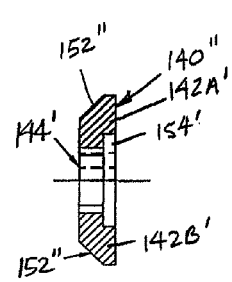

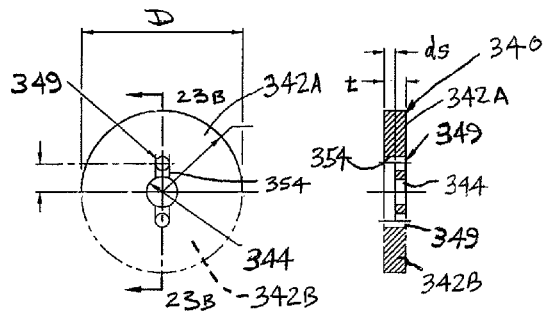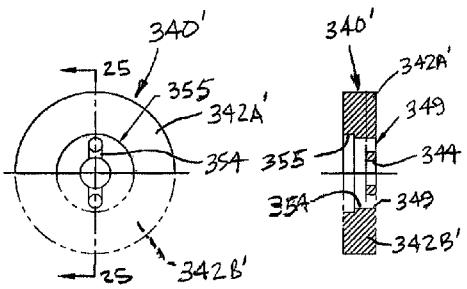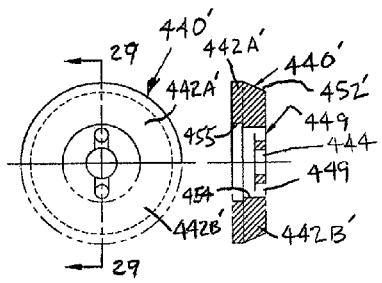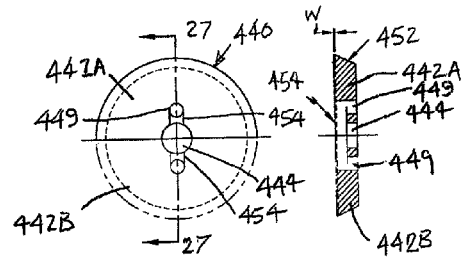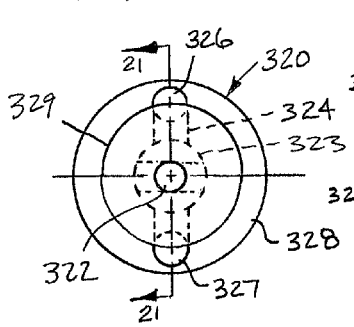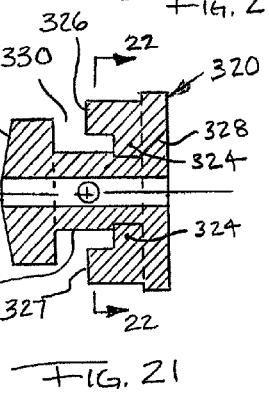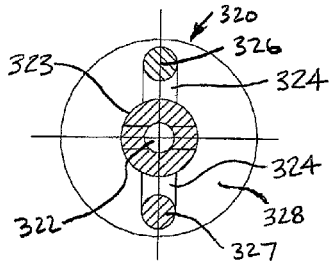

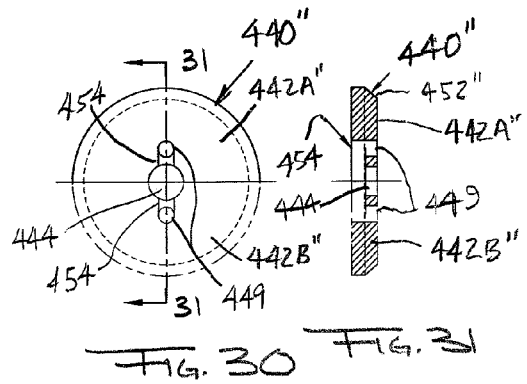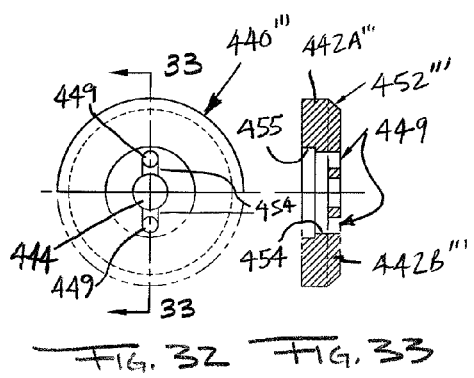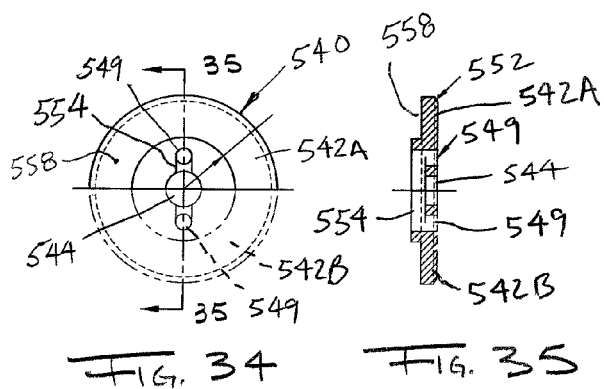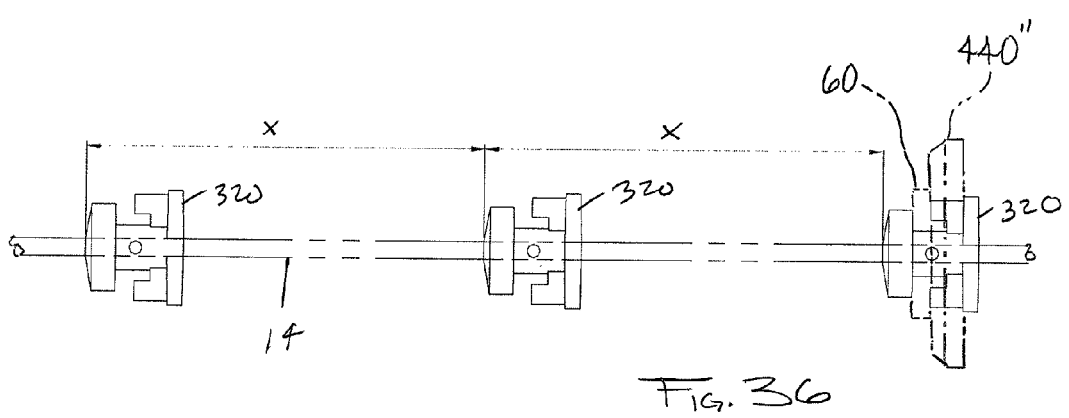

DRAG CONVEYOR SYSTEM

CROSS-REFERENCE TO RELATED APPLICATIONS

This application claims the benefit of U.S. Provisional Patent Application No. 61/482,766, filed May 5, 2011, which is incorporated herein by reference as if fully set forth.

BACKGROUND

The present invention generally relates to a drag conveyor or cable conveyor. Such conveyors are known and generally include an outer tube through which a cable, chain or other traction element is drawn. Disks are attached to the traction element at periodic intervals and, by moving the traction element in a transport direction, granular material that is fed through an opening in the tube into spaces between disks is carried forward through the tube to an unloading point where the tube is opened in a bottom area so that the granular material can be discharged.

Such conveyors are useful for moving granular material without damaging or breaking down the material which can occur with augur-type tube conveyors. Since the material is merely pushed along the inside of the tube by the disks which are attached to the conveyor traction element, the likelihood of damage to the granular material being transported is greatly reduced.

Known drag or cable type conveyor systems generally connect the disks to the traction element using clamps that are bolted about the cables, chain or other type of traction element or multi-part disks which are bolted together around the traction element and fixed in position via the clamping force of the bolted connection. However, this type of arrangement is more expensive to produce due to the configuration of the disks and is also more difficult to maintain as the disks must be disassembled for repair and/or replacement. One example of a prior known system is U.S. Pat. No. 2,124,485, which is incorporated herein by reference as if fully set forth.

SUMMARY

The present invention provides a drag conveyor system having a tube and a traction element extending through the tube. The traction element can be a cable, chain, belt, or any other type of flexible element that can be drawn through the tube. A plurality of slugs are connected to the traction element, with each of the slugs including a slug flange. A disk is removably attached to each of the slugs. The disk includes first and second disk parts that are adapted to be placed around the traction element and axially engaged with one another and/or the slug so that each of the disks is located on the respective one of the slugs. A snap clip is engaged to each of the slugs. The snap clip includes a flange located on an opposite side of the disk from the slug flange that, together with the slug flange, maintains the first and second disk parts together and engaged with the slug in a fixed position on the slug.

In the preferred application, the snap clip is easily removable without the use of tools thus allowing for easier maintenance through a simple removal of the snap clip allowing the disk parts to be axially removed from the slug and, depending on the configuration of the disk parts also disengaged from one another, for easy removal from the traction element. Further, the configuration of the disks allows them to be machined from flat polymeric sheet or plate material or other flat material such that various different materials can be used depending upon the particular application.

Preferably, each of the slugs includes a groove that receives a respective one of the snap clips. The groove is spaced by a distance greater than or equal to a thickness of the disk, or is spaced by a distance greater than or equal to a thickness of the disk in a recessed area that contacts the slug flange. Thus, thicker material can be used for the disk without changing the slugs if a recess is provided in the disk in the area contacted by the slug flange.

In one preferred embodiment, the slugs include at least one alignment tab and the disk includes at least one complementary recess adapted to be aligned with the alignment tab on the slug in order to maintain the disk in a fixed orientation with respect to the slug.

In another preferred embodiment, the slugs include an alignment and engagement feature for holding the disk parts in an aligned position on the slug.

In a preferred embodiment, the slugs are over-molded onto the traction element. However, they can be attached by other means, such as clamps or pins.

Preferably, the first and second disk parts have the same shape.

Optionally, each of the first and second disk parts can also include a projection and a complementary recess adapted to receive the projection of the other one of the first and second disk parts.

It is also possible to provide first and second disk parts with different shapes as long as the first and second disk parts can be axially engaged with one another and/or the slug in order to form the disk.

In order to allow for easier movement of the disks through the tube, it is possible to chamfer a periphery of the disks on the trailing side in the direction of travel in order to reduce the contact area between the disks and the inside of the tube.

The snap clips are preferably also formed from a polymeric material and include a slot leading to a center opening that is adapted to engage a complementary portion of a respective one of the slugs located within a snap clip groove defined on the slug. The center opening is preferably generally circular and the slot has a smaller dimension than a dimension of the center opening at a point where the slot intersects the center opening, defining two over-center portions of the snap clip adjacent to the opening. These over-center portions preferably are spaced apart by a dimension that is about 0.020 to 0.040 inches less than a diameter of the opening. The slot is preferably tapered wider at a periphery of the snap clip than at a position of the over-center portions. In order to hold the disks in position and maintain the two parts of the disk axially assembled with one another, the snap clip overlaps at least a portion of the projections and complementary recesses of the disk parts.

In another aspect, a drag conveyor system is provided having a tube and a traction element extending through the tube. The traction element can be a cable, chain, belt, or any other type of flexible element that can be drawn through the tube. A plurality of slugs are connected to the traction element, with each of the slugs including a slug flange. A disk is removably attached to each of the slugs. The disks are provided having a reduced land area, preferably created by beveling or chamfering the periphery of the disks. The disks can be assembled from two disk parts or can be one-piece disks. In one preferred embodiment, the land area has a width of less than about 0.050 inches, and more preferably is a width of less than about 0.031 inches. However, increased land area widths can be provided. The disks are preferably made of UHMW polyethylene and have a reduced friction force when traveling through the tube.

These features can be used either alone or in various combinations with one another in order to provide the drag conveyor system in accordance with the invention.

BRIEF DESCRIPTION OF THE DRAWINGS

The foregoing Summary as well as the following Detailed Description will be readily understood in conjunction with the appended drawings which illustrate preferred embodiments of the invention. In the drawings:

FIG. 1 is a perspective view of a portion of a drag conveyor system in accordance with the present invention.

FIG. 2A is an elevational view showing a cable and slugs assembled with one another used in the drag conveyor.

FIG. 2B is an elevational view showing a chain and slugs assembled with one another for use in a drag conveyor.

FIG. 3 is a side view, partially in cross-section of a slug configuration that is molded onto the cable.

FIG. 4 is a front view, partially in cross-section showing the configuration of the slug.

FIG. 5 is an elevational view showing a first disk part (in solid lines) axially engaged with a second disk part (in broken lines) forming a disk.

FIG. 6 is a cross-sectional view taken along line 6-6 in FIG. 5.

FIG. 11 is an elevational view showing a second embodiment of the disk.

FIG. 12 is a cross-sectional view taken along line 12-12 showing the second embodiment of the disk.

FIG. 13 is an elevational view showing a third embodiment of a disk.

FIG. 14 is a cross-sectional view taken along line 14-14 in FIG. 13.

FIG. 15 is an elevational view showing a fourth embodiment of a disk.

FIG. 16 is a cross-sectional view taken along line 16-16 in FIG. 15.

FIG. 17 is an elevational view showing a fifth embodiment of a disk.

FIG. 18 is a cross-sectional view taken along line 18-18 in FIG. 17.

FIG. 20 is an end view of a second embodiment of a slug for a drag conveyor system in accordance with the invention.

FIG. 21 is a cross-sectional view taken along line 21-21 in FIG. 20.

FIG. 22 is a cross-sectional view taken along line 22-22 in FIG. 21.

FIG. 23A is an elevational view of a seventh embodiment of a disk for use with the slug of FIGS. 20-22.

FIG. 23B is a cross-sectional view taken along line 23B-23B in FIG. 23A.

FIG. 24 is an elevational view showing an eighth embodiment of the disk.

FIG. 25 is a cross-sectional view taken along line 25-25 in FIG. 24.

FIG. 26 is an elevational view showing a ninth embodiment of a disk.

FIG. 27 is a cross-sectional view taken along line 27-27 in FIG. 26.

FIG. 28 is an elevational view showing a tenth embodiment of a disk.

FIG. 29 is a cross-sectional view taken along line 29-29 in FIG. 28.

FIG. 30 is an elevational view showing an eleventh embodiment of a disk.

FIG. 31 is a cross-sectional view taken along line 31-31 in FIG. 30.

FIG. 32 is an elevational view showing a twelfth embodiment of a disk.

FIG. 33 is a cross-sectional view taken along line 33-33 in FIG. 32.

FIG. 34 is an elevational view showing a thirteenth embodiment of a disk.

FIG. 35 is a cross-sectional view taken along line 35-35 in FIG. 34.

FIG. 36 is a side view showing the second embodiment of the slugs on a cable.

DETAILED DESCRIPTION OF THE PREFERRED EMBODIMENTS

Figure 9:
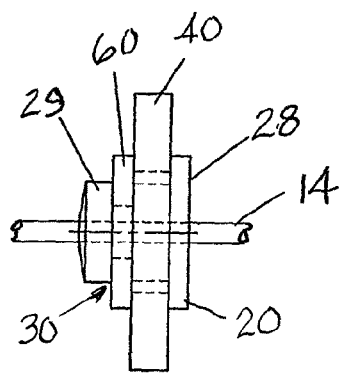
FIG. 9 is an elevational view showing the assembly of a disk on a slug using a snap clip.

Certain terminology is used in the following description for convenience only and is not considered limiting. The words "right," "left," "lower" and "upper" designate directions in the drawings to which reference is made. This terminology includes the words specifically noted above, derivatives thereof and words of similar import. Additionally, the terms "a" and "one" are defined as including one or more of the referenced items unless specifically noted. As used herein, "traction element" refers to a cable, chain, belt, or other flexible element that can be drawn through a tube to provide a form of motion generation for the disks. Additionally, certain similar elements are described in multiple embodiments and are indicated with a prime—such as the disk parts 42A, 42B and the disk parts 42A' and 42B'. These similar elements have generally the same configuration and function with only minor differences as noted.

Referring to FIG. 1, a drag conveyor system 10 in accordance with the invention is shown. The drag conveyor system 10 preferably includes a tube 12, a portion of which of which is shown in FIG. 1. The tube 12 is preferably made of metal, and can be an alloy steel or stainless steel. The tube 12 can also be a polymeric material as well. The tube 12 preferably has a smooth interior having an internal diameter that is slightly greater than an external diameter of the disk, as will be explained in further detail below. A traction element, which in the first preferred embodiment is a cable 14, has slugs 20 located thereon and extends through the tube 12. The slugs 20 are preferably spaced apart at fixed intervals X as shown in FIG. 2A. In a preferred embodiment, the spacing between the slugs is X=6 inches. However, those skilled in the art will recognize that other dimensions can be utilized. The cable 14 is preferably a wire rope and can be coated with a polymeric material or can be uncoated, depending upon the application.

The cable 14 is preferably endless and is moved through the tube 12 by a drive system, not shown, that can be for example a motor driven pulley arrangement such as provided in U.S. Pat. No. 810,149 or various other drive systems known to those skilled in the art.

As shown in FIGS. 1 and 2A, the slugs 20 preferably include a slug opening 22 where the cable 14 extends through each of the slugs 20. The slugs 20 each further includes a disk support portion 24, which is preferably circular in configuration having a diameter d2 as shown in FIGS. 3 and 4. Preferably at least one disk alignment tab 26 is located on at least one of the slugs 20 and preferably all of the slugs 20. In the preferred embodiment, as shown in FIGS. 3 and 4, two disk alignment tabs 26 are provided spaced apart 180° from one another. The slug 20 further includes a slug flange 28 having a diameter d3 as shown in FIG. 4. While the slug flange is shown as being circular, it could have other configurations. Finally, the slug includes a groove 30 located behind a front section 29, at the opposite end from the groove 30, which creates a circular recess having a diameter d4.

Preferably, the slug 20 is over-molded onto the cable 14, as shown in FIG. 2A. However, it could also be formed in two pieces and either bolted or otherwise fastened to the cable 14 or any other type of traction element at the desired spacing X. As shown in FIG. 2B, the slug 20' here is molded onto the link of a chain 14' that is used as the traction element. The slug 20' has the same configuration as the slug 20, except that the chain link extends through two openings 22' defined through the slug 20'.

Referring to FIGS. 1, 5 and 6, a disk assembly 40 is located on the slug 20. The disk assembly 40 preferably includes a first disk part 42A and a second disk part 42B that are adapted to be placed around the cable 14 and are axially engageable with one another by sliding the disk parts 42A and 42B together so that the cable 14 is located in an interior opening 44 defined by the engaged first and second disk parts 42A, 42B. As shown in detail in FIG. 5, the first and second disk parts 42A, 42B have the same shape and each of the first and second disk parts 42A, 42B includes a projection 48 as well as a complementary recess 50, preferably located on the opposite side of the interior opening 44 from the projection 48, which is adapted to receive the projection 48 of the other one of the first and second disk parts. As shown in detail in FIG. 5, in the preferred embodiment the projection 48 is generally T-shaped. However, other styles of slidable interlocking connections could be provided, if desired, such as a sliding interlocking connection. Preferably, the disks 40 are circular and have a diameter D that is less than an inside diameter of the tube 12. In one preferred embodiment, the internal diameter of the tube is 3.75 inches and D=3.62 inches.

Preferably, the first and second disk parts 42A, 42B are made of a polymeric material and are preferably machined from a flat polymeric sheet material. This allows the disk parts 42A, 42B to be easily made from various different types of polymeric materials depending upon the particular application for the drag conveyor. For example, the disk parts 42A, 42B could be made from EPDM (ethylene propylene diene Monomer), UHMW PE, PTFE, nylon 6, acrylic or various other polymeric materials. However, the disk parts 42A, 42B could be molded, thermoformed, or produced by various other processes. It would also be possible to form the first and second disk parts 42A, 42B from various other materials including metals which can optionally be coated with a polymeric material such as PTFE.

Each of the disks 40 assembled from first and second disk parts 42A, 42B is adapted to be axially movable onto a respective one of the slugs 20 with the center opening 44 and the recesses 46 engaging the complementary disk support 24 and the alignment tabs 26 on the slug 20.

Figure 7:
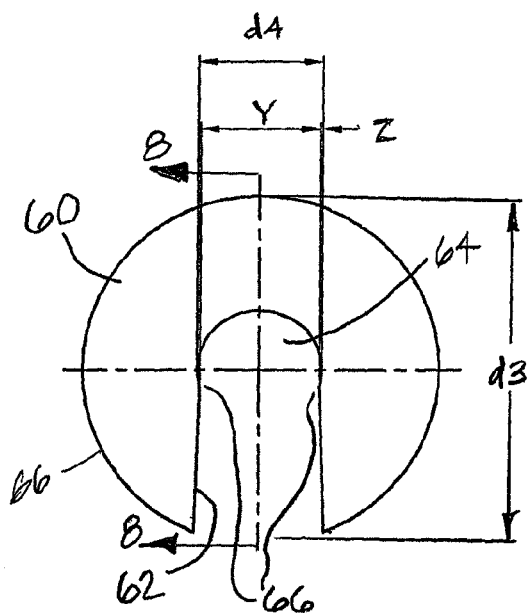
FIG. 7 is an elevational view of a snap clip in accordance with the invention.
Figure 8:
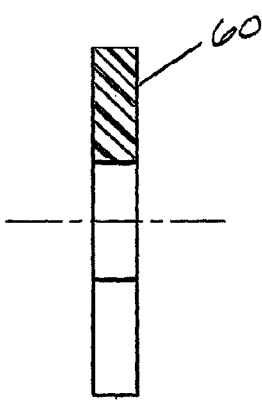
FIG. 8 is a cross-section view taken along line 8-8 through the snap clip of FIG. 7.

Referring to FIGS. 7-9, a snap clip 60 is engaged to each of the slugs 20. As shown in detail in FIGS. 7 and 8, the snap clips 60 include a flange 66 that is located on an opposite side the disk 40 from the slug flange 28 in the installed position. The snap clip 60 also includes a slot 62 that leads to a center opening 64 that is adapted to engage the complementary portion of the slug 20 defined by the groove 30. The center opening 64 is preferably generally circular and has a diameter d4 which is approximately equivalent to the diameter d4 defined in the slug by the groove 30 as shown in FIG. 3. Alternatively, it could have any other suitable shape. The slot 62 has a smaller dimension than the diameter d4 of the center opening 64 at a point where the slot 62 intersects the center opening 64 defining two over-center portions 66 of the snap clip 60 located adjacent to the opening 64. As shown in FIG. 7, a dimension Y between the two over-center portions 66 is less than a diameter d4 of the opening 64 in order to create an interference fit that retains the snap clip 60 in position on the slug 20. In the preferred embodiment, the dimension Y is approximately 0.020 to 0.040 inches less than a diameter d4 of the opening. This leaves an approximately 0.10 to 0.20 dimension Z on either side of the slot 62 for maintaining the snap clip 60 in position in the groove 30 of the slug 20 when installed. While preferred dimensions have been noted, those skilled in the art will recognize that other dimensions can be utilized. Other types of snap rings could also be utilized.

As shown in FIG. 9, the snap clip 60 engaged in the groove 30 of the slug 20 in combination with the slug flange 28 maintain the first and second disk parts 42A, 42B engaged with one another in a fixed position on the slug 20. Thus, in order to affix the disk 40 to the slug 20, for assembly and/or maintenance, all that is required is for two disk parts 42A, 42B to be arranged about the cable 14 and then axially slidably engaged with one another such that the projections 48 of the disk parts 42A, 42B engage the complementary recesses 50 in the opposing disk part 42A, 42B. Once axially assembled, the disk 40 is slid onto the slug 20 over the front section 29 and then locked in position by the user inserting a snap clip 60 into the groove 30 on the slug 20. Preferably an outer periphery of the snap clip 60 overlaps at least a portion of the projections 48 and complementary recesses 50 of the disk parts 42A, 42B. However, this is not a requirement, depending on the material of the disk parts 42A, 42B.

As shown in FIG. 9, preferably the groove 30 in the slug is spaced by a distance greater than or equal to a thickness of the disk 40 from the slug flange 28 so that the disk parts 42A, 42B which form the disk 40 are trapped in position and cannot come apart unless the snap clip 60 is removed. A small amount of play can be provided to allow for ease of insertion of the snap clip 60 such that the spacing between the snap clip 60 and the slug flange 28 is 0.010 to 0.020 inches greater than a thickness of the disk 40.

Figure 10:
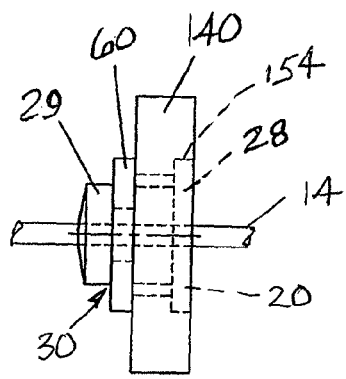
FIG. 10 is an elevational view showing an alternate embodiment of a disk being attached to a slug using a snap clip in accordance with the invention.

Depending upon the particular application, if a thicker disk is required, it is possible to use the same arrangement as will be explained in detail with reference to FIG. 10. Here, the disk 140, which is the same as the disk 40 in all respects except that it is thicker, is utilized in connection with the slug 20 and the snap clip 60. In order to accommodate for the greater thickness of the disk 140, a counter-bore is provided such that the thickness of the disk 140 is reduced in a recess area 154 that contacts the slug flange 28 so that the distance between the groove 30 and the slug flange 28 is equal to or greater than the thickness of the disk 140 in the recessed area 154. FIGS. 13 and 14 show the disk 140 in greater detail with the disk parts 142A, 142B that define the interior opening 144 as well as the projections 148 and recesses 150. The recessed area 154 is shown in FIG. 14. In all other respects, the geometry of the disk 140 is the same as the disk 40.

An additional embodiment of the disk 40' is shown in FIGS. 11 and 12. The disk 40' is the same as the disk 40 except that a chamfer 52 is provided around the periphery of the disk 40' formed from the first and second disk parts 42A', 42B'.

While a straight chamfer is shown, other shapes, such as a radiused edge could be provided on the disks.

Referring to FIGS. 15 and 16, an alternate embodiment of the disk 140' is shown. The disk 140' is the same as the disk 140 except that a chamfer 152' is located around the periphery of the disk 140'. The disk 140' includes the first and second disk parts 142A', 142B' that define the opening 144', as well as the projections 148' and 150' for interlocking the disk parts 142A', 142B' together, and the recessed area 154' to accommodate for the increased disk thickness.

Referring to FIGS. 17 and 18, another embodiment of the disk 140" is shown. The disk 140" is generally the same as the disk 140' except that the chamfer 152" is greater than the chamfer 152'.

While it is preferred that the first and second disk parts 42A, 42B; 142A, 142B have the same shape and that each of the first and second disk parts includes a projection and a complementary recess adapted to receive the projection of the other one of the first and second disk parts, it is also possible to form the first and second disk parts with different shapes as long as these two parts axially slide together and interlock with one another in order to form the complete disk having the outside diameter D.

Figure 19:
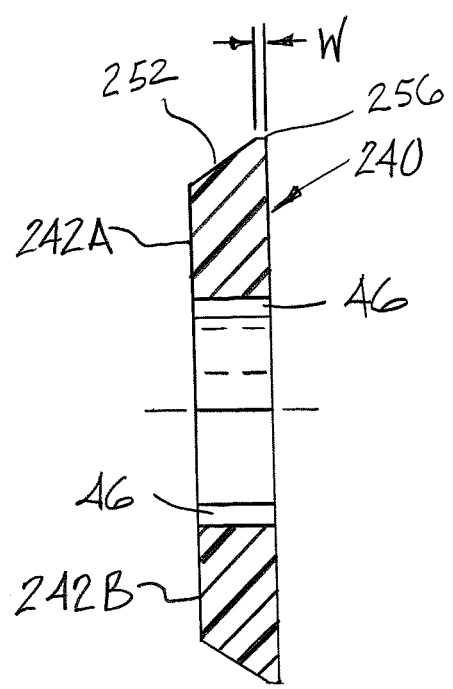
FIG. 19 is a cross-sectional view through a sixth embodiment of a disk.

Referring to FIG. 19, a further embodiment of a disk 240 is shown. The disk 240 is preferably a two part disk having first and second disk parts 242A, 242B, similar to the previous embodiments. The disk 240 could also have a different construction. Here, in order to reduce drag of the disks 240 in a tube 12 of a drag conveyor 10, the disks 240 have a land area 256, preferably created by a bevel or chamfer 252 around the periphery of the disk 240 that has a width W that is 0.050 inches or less. Preferably, the land area has a width W of 0.031 inches or less. The disk 240 is preferably made of UHMW polyethylene which has a low friction coefficient in order to further reduce the drag forces generated by the disks 240 as they are being drawn through the tube 12.

Preferably, the first and second disk parts 242A, 242B are assembled and connected to the slugs 20 in the same manner as the first and second disk parts 42A, 42B discussed above.

Referring to FIGS. 20-22, a second embodiment of the slug 320 is shown. A plurality of the slugs 320 are connected to or overmolded onto a traction element, such as a cable 14, as shown in FIG. 36. Each of the slugs 320 includes a center opening 322, a center body 323, and a slug flange 328 located at one axial end. Center disk alignment portions 324 extend from the slug flange 328. Pins 326 and 327 extend axially from the ends of the center disk alignment portions 324, parallel to the center opening 322. A groove 330 is defined in the slug 320 behind a front section 329 on the opposite side of the slug 320 from the flange 328. The disk alignment portions 324 and the pins 326, 327 are spaced apart by 180°, and extend from the slug flange 328 toward the groove, and the disk alignment portions 324 extend from the respective pins toward an axial center of the slug 320. In comparison to the first embodiment of the slug 20, the second embodiment of the slug 320 includes provisions for maintaining two disk parts together and in an aligned position with one another to form a disk as well as fixing the disks on the traction element.

Referring to FIGS. 23A, 23B and 24-35, additional embodiments of the disks are shown for use in connection with the second embodiment of the slug 320. In these embodiments of the disks, the projections 48 and complementary recesses 50 in the disk parts which were needed for use in connection with the first embodiment of the slug 20 have been omitted. Instead, the disk parts are aligned and engaged onto the slugs 320 to form the disks.

Referring to FIGS. 23A and B, the disk 340 formed from two disk parts 342A and 342B is shown in detail. The assembled disk 340 has a diameter D, and a thickness t, and is preferably formed from the same materials as discussed above in connection with the previous embodiments of the disks. A center opening 344 is defined in the assembled disk parts 342A, 342B that can engage over the center body 323 of the slug 320. Each of the disk parts 342A, 342B also includes a hole 349 that is adapted to align with the corresponding pin 326, 327 on the slug 320. A center slot 354 extends from the area of each of the holes 349 toward the center opening 344, and is complementary in size and shape to the disk alignment portion 324 on the slug 320. As shown in FIG. 23B, the depth ds of the center slot 354 is less than the thickness t of the disk 340. The disk parts 342A, 342B are identical in shape, and can be machined from flat stock, providing advantages with respect to material selection and manufacturing the parts as needed rather than having to keep a standing inventory.

The disk parts 342A, 342B are assembled onto a slug 320 to form the disk 340 by aligning each of the disk parts 342A, 342B over the groove 330 in the slug 320 and sliding them radially inwardly such that the center opening 344 is formed around the center body 323. The disk parts 342A, 342B are then slid axially on the slug 320 with the center slots 354 engaging the disk alignment portions 324 of the slug 320 while at the same time, the pins 326, 327 engage in the respective alignment holes 349 of the disk parts 342A, 342B. The snap clip 60 is then engaged in the groove 330, locking the aligned disk parts 342A, 342B to the slug 320.

FIGS. 24 and 25 show another embodiment of the disk 340' that is identical to the disk 340 as shown in FIGS. 23A and 23B, except that the thickness t of the disk is increased. In order to accommodate this increased thickness, a counter-bore 355 is formed in the assembled disk parts 342A', 342B' that is large enough to accommodate the slug flange 328. The disk 340' is assembled to the slug 320 in the same manner as the disk 340, with the counter-bore accommodating the slug flange 328 so that the same spacing and dimensions are present for the interface between the disk parts 342A', 342B' and the slug 320.

FIGS. 26 and 27 show another embodiment of the disk 440 that is similar to the embodiment 340, except that the edge includes a chamfer 452, which can be at any desired angle, for example 10° to 60°, defining a land width w, as discussed in some of the embodiments of the disks above. Here, w is about 0.031 inches. All of the other elements are the same as the disk 340, and have the same element number plus 100, so that here, the disk parts 442A, 442B generally correspond to the disk parts 342A, 342B of the disk 340. The holes 449 and center slot 454 are configured the same as the corresponding elements 349 and 354 on the disk 340 so that the disk 440 can be assembled and connected in the same manner to the slug 320.

Referring to FIGS. 28 and 29, another embodiment of the disk 440' is shown, which is assembled from disk parts 442A', 442B' in the same manner as the disks 440 and 340 discussed above. The disk 440' has an increased thickness t, similar to the disk 340', and accordingly, has a counter-bore 455 that is similar to the counter-bore 355 to accommodate the slug flange 328. The dist 440' has a chamfer 452' with a chamfer angle shown as 23° with a land width w of about 0.25 inches. The disk 440' is assembled to the slug 320 in the same manner as discussed above in connection with the disk 340 and 340'.

Referring to FIGS. 30 and 31, another embodiment of the disk 440" is shown formed from disk parts 442A", 442B". The disk 440" is generally the same as the disk 440, except the angle of the chamfer 452" is shown at about 41° and the land width w is about 0.25 inches. The disk 440" is assembled to the slug 320 in the same manner as discussed above in connection with the disk 440.

Referring to FIGS. 32 and 33, another embodiment of the disk 440''' is shown formed from disk parts 442A''', 442B'''. The disk 440''' is generally the same as the disk 440' and includes the counter-bore 455 to accommodate the increased thickness of the disk 440''', with the difference being that the angle of the chamfer 452''' is shown at about 41° and the land width w is about 0.5 inches. The disk 440''' is assembled to the slug 320 in the same manner as discussed above in connection with the disk 440'.

FIGS. 34 and 35 show an additional embodiment of the disk 540 that is similar to the disk 440, and similar elements have been identified with the same reference numbers plus 100. For example, the disk parts 542A, 542B correspond generally to the disk parts 442A, 442B discussed above, with the differences noted below. Here, a small chamfer 552 is provided that is 60°×0.063 inches. In this case the land width is reduced to about 0.25 inches by forming a shoulder recess 558 that extends around the outer periphery of the disk on the side that faces away from the slug flange 328 in the assembled state. The shoulder recess 558 ends outside of the interface area with the slug 320 so that the holes 549 and center slot 554 have the same configuration as in disks 340, 440 to match the slug 320.

The disks 340, 340', 440, 440', 440", 440''', and 540 are assembled to the slugs 320 generally is the same manner as described above. The disk halves 342A, 342B (and related primes); 442A, 442B (and related primes); 542A, 542B are each aligned with the groove 330 in the slug 320 and slid radially inwardly and are then slid axially on the slug 320 with the center slot 354, 454, 554 engaging over the slug alignment portion 324 while at the same time, the pins 326, 327 engage in the respective alignment holes 349, 449, 549 of the disk parts 342A, 342B. The snap clip 60 is then engaged in the groove 330, locking the aligned disk parts 342A, 342B to the slug 320. One disk 440" is shown installed on the slug 320 in FIG. 36.

According to the invention, not only are cost savings achieved by allowing for easier assembly and/or maintenance of the disks 40, 140, 240, 340, 440, 540 (and related primes) on the traction element 14, but also a greater adaptability of the drag conveyor 10 is possible by the use of various different materials for the disk parts 42A, 42B; 142A, 142B; 242A, 242B; 342A, 342B; 442A, 442B; 542A, 542B (as well as the related primes) which can be machined from various different polymeric or other flat stock in a simple and cost efficient manner. Thus, it is not necessary for manufacturer to stock large quantities of disks 40, 140, 240, 340, 440, 540 made from various different materials but rather, the disks can be easily machined from flat stock upon demand, reducing inventory and overhead costs associated with not only manufacturing drag conveyors 10 in accordance with the invention, but also maintenance of drag conveyors.

It will be appreciated by those skilled in the art that changes can be made to the embodiments of the invention described above without departing from the broad inventive concept thereof. It is also understood that various portions of the invention can be used alone or in combination and that not all of the components are required for any particular application. It is therefore understood that this invention is not limited to the particular embodiments disclosed, but it is intended to cover modifications within the spirit and scope of the present invention.

We claim:

1. A drag conveyor system, comprising:
a tube;
a traction element extending through tube;
a plurality of slugs connected to the traction element, each of the slugs including a slug flange;
a disk removably attached to each of the slugs, each of the disks including first and second disk parts, each defining a partial outer circumference of a complete disk and including only a portion of an interior opening through the disk adapted to engage over the slug, the first and second disk parts are placed around the traction element from longitudinal sides of the traction element and the first and second disk parts are axially engagable with one another for interlocking connection in a radial direction so that each of the disks is located on the respective one of the slugs; and
a snap clip engaged to each of the slugs, the snap clip including a flange located on an opposite side of the disk from the slug flange that, together with the slug flange, maintains the first and second disk parts axially together and engaged with the slug in a fixed position on the slug.

2. The drag conveyor system of claim 1, wherein each of the slugs includes a groove that receives a respective one of the snap clips, the groove is spaced by a distance greater than or equal to a thickness of the disk from the slug flange.

3. The drag conveyor system of claim 1, wherein each of the slugs includes a groove that receives a respective one of the snap clips, the groove is spaced by a distance greater than or equal to a thickness of the disk in a recessed area of the disk that contacts the slug flange from the slug flange.

4. The drag conveyor system of claim 1, wherein at least one of the slugs includes at least one disk alignment tab, and the disk includes at least one complementary recess adapted to be aligned with the disk alignment tab to maintain the disk in a fixed orientation with respect to the slug.

5. The drag conveyor system of claim 1, wherein the traction element is a cable, and each of the slugs is over-molded onto the cable.

6. The drag conveyor system of claim 1, wherein the first and second disk parts have the same shape.

7. The drag conveyor system of claim 6, wherein each of the first and second disk parts includes a projection and a complementary recess adapted to receive the projection of the other one of the first and second disk parts.

8. The drag conveyor system of claim 1, wherein a periphery of each of the disks is chamfered.

9. The drag conveyor system of claim 1, wherein the first and second disk parts are made of polymeric material.

10. The drag conveyor system of claim 1, wherein the first and second disk parts are machined flat polymeric sheet material.

11. The drag conveyor system of claim 1, wherein each of the snap clips includes a slot leading to a center opening adapted to engage a complementary portion of a respective one of the slugs located within a snap clip groove defined on the slug.

12. The drag conveyor system of claim 11, wherein the center opening is generally circular, and the slot has a smaller dimension than a diameter of the center opening at a point where the slot intersects the center opening, defining two over-center portions of the snap clip adjacent to the opening.

13. The drag conveyor system of claim 1, wherein each of the slugs includes a groove to receive the snap clip, and two axially extending pins extend from the slug flange toward the groove, and the disk parts each have a corresponding complementary hole to receive a respective one of the pins.

14. The drag conveyor system of claim 13, wherein each of the slugs includes a disk alignment portion that extends from the slug flange toward the groove, and extends from a respective one of the pins toward an axial center of the slug, and the disk parts include a corresponding center slot to receive the disk alignment portion of the slug.

15. The drag conveyor system of claim 1, wherein a shoulder recess extends around an outer periphery of the disk on a side that faces away from the slug flange.

16. The drag conveyor system of claim 15, wherein a chamfer is located on the disk on a side that faces away from the slug flange.

* * * * *